United States Patent
Bovero et al.

(10) Patent No.: US 10,436,655 B2
(45) Date of Patent: Oct. 8, 2019

(54) FLUOROPHORE ENHANCED MULTIDIMENSIONAL PHOTONIC SENSORS

(71) Applicant: Saudi Arabian Oil Company, Dhahran (SA)

(72) Inventors: Enrico Bovero, Dhahran (SA); Gasan Alabedi, Dhahran (SA); Abdullah A. Al-Shahrani, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 165 days.

(21) Appl. No.: 15/650,478

(22) Filed: Jul. 14, 2017

(65) Prior Publication Data

US 2019/0017887 A1    Jan. 17, 2019

(51) Int. Cl.
*G01L 1/24* (2006.01)
*G01M 5/00* (2006.01)
(Continued)

(52) U.S. Cl.
CPC .............. *G01L 1/246* (2013.01); *G01B 11/18* (2013.01); *G01D 5/35316* (2013.01);
(Continued)

(58) Field of Classification Search
CPC .... G01L 1/246; G01B 11/18; G01D 5/35316; G01D 5/35338; G02B 6/02042;
(Continued)

(56) References Cited

U.S. PATENT DOCUMENTS

| 6,024,488 A | 2/2000 | Wu et al. |
| 7,473,906 B2 * | 1/2009 | Egalon ............... G01N 21/6428 250/458.1 |

(Continued)

FOREIGN PATENT DOCUMENTS

| CN | 1844856 A | 10/2006 |
| EP | 2502102 A1 | 9/2012 |
| EP | 2896978 A1 | 7/2015 |

OTHER PUBLICATIONS

Cicero Martelli et al, "Strain and temperature characterization of photonic crystal fiber Bragg gratings", Optics Letters, vol. 30, No. 14, p. 1785-1787. Jul. 15 2005.

(Continued)

Primary Examiner — Seung C Sohn
(74) Attorney, Agent, or Firm — Leason Ellis LLP

(57) ABSTRACT

A photonic displacement sensor comprises a photonic fiber including a) a core section having a first band gap aligned along an extended longitudinal axis, and b) a cladding section surrounding the core section having a second band gap. The first band gap is adapted to block a spectral band of radiation centered on a first wavelength that is directed along the longitudinal axis, and the second band gap is adapted to block a spectral band of radiation centered on a second wavelength that is directed transversely to the longitudinal axis, and wherein displacement is detected based on a shift in at least one of the first and second band gap of the photonic fiber, enabling an intensity of radiation to be detected that is in proportion to the displacement in the photonic fiber.

20 Claims, 6 Drawing Sheets

(51) Int. Cl.
  *G02B 6/02* (2006.01)
  *G01D 5/353* (2006.01)
  *G01B 11/16* (2006.01)
  *B82Y 20/00* (2011.01)

(52) U.S. Cl.
  CPC ...... *G01D 5/35338* (2013.01); *G01M 5/0041* (2013.01); *G02B 6/023* (2013.01); *G02B 6/02042* (2013.01); *G02B 6/02076* (2013.01); *B82Y 20/00* (2013.01); *G02B 6/02347* (2013.01)

(58) Field of Classification Search
  CPC ............. G02B 6/023; G02B 6/02076; G02B 6/02347; G01M 5/0041; B82Y 20/00
  USPC ........................................ 250/237 G, 237 R
  See application file for complete search history.

(56) References Cited

U.S. PATENT DOCUMENTS

| | | | |
|---|---|---|---|
| 7,499,605 B1* | 3/2009 | Xia | G01K 11/3206 385/12 |
| 7,539,361 B2* | 5/2009 | Dimmick | G01K 11/3206 385/12 |
| 7,790,406 B2 | 9/2010 | Cunningham et al. | |
| 8,781,265 B2 | 7/2014 | Haslinger | |
| 2008/0030741 A1 | 2/2008 | Digonnet et al. | |
| 2008/0278722 A1 | 11/2008 | Cunningham et al. | |
| 2009/0225807 A1 | 9/2009 | MacDougall et al. | |
| 2012/0134621 A1 | 5/2012 | Haslinger | |

OTHER PUBLICATIONS

Tu, Y. et. al., "An Improved Metal-Packaged Strain Sensor Based on a Regenerated Fiber Bragg Grating in Hydrogen-Loaded Boron—Germanium Co-Doped Photosensitive Fiber for High-Temperature Applications," Sensors, vol. 17, No. 431, p. 1-18. 2017.

Rosenberger, M. et. al., "Simultaneous 2D Strain Sensing Using Polymer Planar Bragg Gratings," Senors vol. 15, p. 4264-4272. 2015.

Kopitzke, S. et al., "An Optical Fiber-Based Sensor Array for the Monitoring of Zinc and Copper Ions in Aqueous Environments" Sensors, vol. 14, p. 3077-3094. 2014.

Forsyth, D. et al., "Dual temperature and strain measurement with the combined fluorescence lifetime and Bragg wavelength shift approach in doped optical fiber," Applied Optics, vol. 41, No. 31, p. 6585-6592. 2002.

Qiao, X. et. al., "Fiber Bragg Grating Sensors for the Oil Industry," vol. 17, No. 429, p. 1-34. 2017.

Ramakrishnan, M. et. al., "Overview of Fiber Optic Sensor Technologies for Strain/Temperature Sensing Applications in Composite Materials," Sensors, vol. 16, No. 99, p. 1-27. 2016.

Gavalis, R. et. al., "Localized active-cladding optical fiber bend sensor," Optical Engineering, vol. 49, No. 6, p. 064401-1-064401-8, Jun. 2010.

* cited by examiner

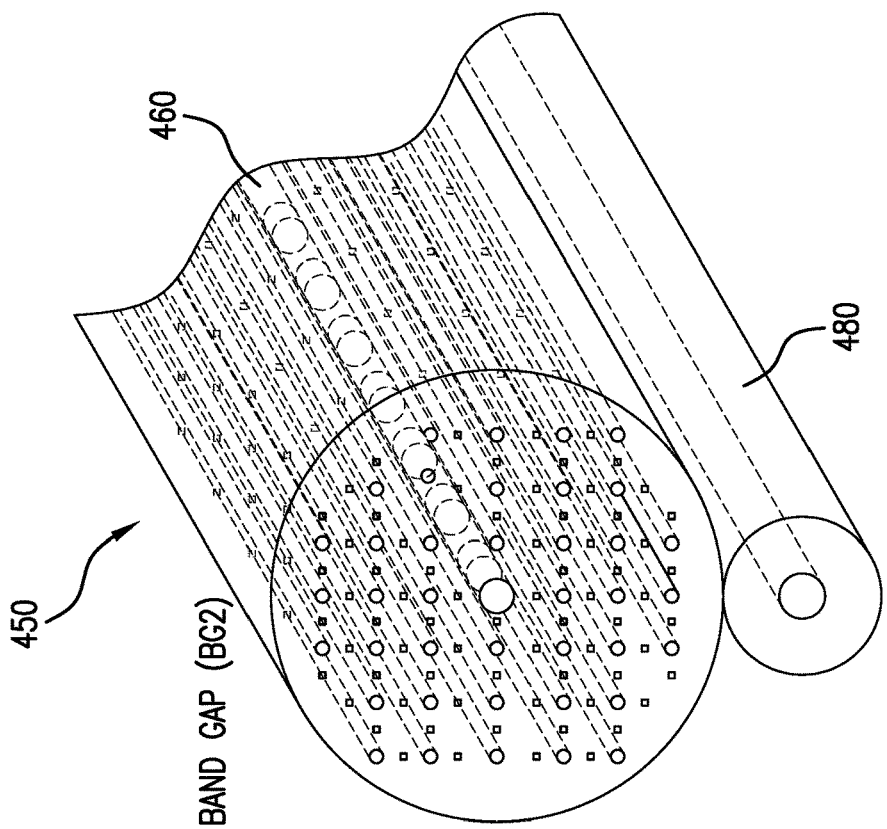
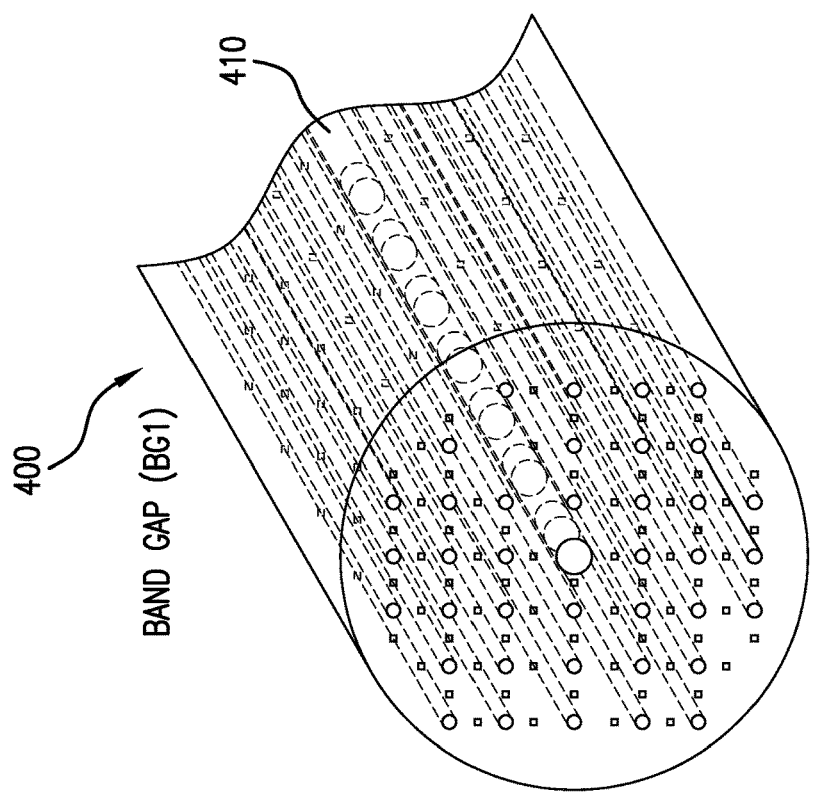
FIG. 4

FLUOROPHORE ENHANCED MULTIDIMENSIONAL PHOTONIC SENSORS

FIELD OF THE INVENTION

The present invention relates to photonic sensors, and in particular relates to a multidimensional photonic sensor for detecting structural deformation that utilizes radiation generated by fluorophores.

BACKGROUND OF THE INVENTION

Pipeline and vessel structures used in the oil and gas industry are exposed to stresses over time that can accumulate to produce defects in the structure. Unfortunately, it is typically difficult to determine whether such structures are being subjected to damaging stresses until easily observable defects occur.

The availability of non-destructive inspection techniques for structural materials, for instance, nonmetallic pipes used in pipelines, is limited. For the most part, the techniques available so far are either destructive to the material or are experimental and unreliable. Even considering current experimental techniques for non-destructive inspection, no current techniques are able to reliably predict the formation of defects, and therefore are generally used to detect only existing defects.

More specifically, existing building materials and the corresponding systems and techniques for inspection of the materials are inadequate for detecting the presence of stresses on or in the material such as tensile stress or compressive stress with sufficient accuracy and precision such that defects can be predicted before they occur. Currently available technologies for sensing material defects are generally based on mono-dimensional fiber Bragg gratings. These fibers provide mono-dimensional information: i.e., they can detect only stress that occurs along the length of the fiber, and only substantial stresses that correspond to already damaged materials with significant cracks and ruptures in the structural material.

There is a need for a method for accurately detecting perturbations in large structures that can be performed quickly and non-destructively.

It is with respect to these and other considerations that the disclosure made herein is presented.

SUMMARY OF THE INVENTION

According to some embodiments of the present invention, a photonic displacement sensor is provided that comprises a photonic fiber including a) a core section having a first band gap aligned along an extended longitudinal axis, and b) a cladding section surrounding the core section having a second band gap. The first band gap is adapted to block a spectral band of radiation centered on a first wavelength that is directed along the longitudinal axis, and the second band gap is adapted to block a spectral band of radiation centered on a second wavelength that is directed transversely to the longitudinal axis, and wherein displacement is detected based on a shift in at least one of the first and second band gap of the photonic fiber, enabling an intensity of radiation to be detected that is in proportion to the displacement in the photonic fiber.

In some embodiments, the core section of the photonic fiber comprises a Fiber Bragg grating and the cladding section is composed of photonic crystal fiber.

In other embodiments, the photonic displacement sensor further comprises a plurality of fluorophores embedded within the cladding section.

Embodiments of the photonic displacement sensor can also comprise a collection fiber positioned adjacent to the cladding of the photonic fiber so as to receive radiation leaked through the cladding.

In some implementations, the photonic displacement sensor further comprises a second photonic fiber including a core section having a third band gap and a cladding section surrounding the core section, wherein the first photonic fiber is adapted to sense tension and the second photonic fiber is adapted to sense compression or vice versa. Such implementations can also include a collection fiber positioned adjacent to the cladding of the photonic fiber so as to receive radiation leaked through at least one of the first photonic fiber and the second photonic fiber.

Embodiments of the photonic displacement sensor can further comprise a plurality of fluorophores positioned in the core section that have an emission wavelength that overlaps the first band gap. In some implementations, the plurality of fluorophores include fluorophores of a first type and fluorophores of a second type, the fluorophores of the second type being excitable by emissions of fluorophores of the first type. The fluorophores of the first type can include Thulium (Tm+3) ions and the fluorophores of the second type can include Dysprosium (Dy+3) ions.

Further embodiments of the photonic displacement sensor include a second core section within the cladding, the second core section having a third band gap different from the first band gap of the first core section. In some implementations, the photonic displacement sensor can include a plurality of fluorophores positioned in the cladding section. A collection fiber can be positioned adjacent to the cladding so as to receive radiation the cladding. The collection fiber can also include a plurality of fluorophores.

Embodiments of the present invention also include a method of determining displacement in a structure that comprises embedding a photonic sensor within the structure, the photonic sensor including a photonic fiber having a core section with a first band gap aligned along an extended longitudinal axis and a cladding section surrounding the core section with a second band gap, wherein the first band gap is adapted to block a spectral band of radiation centered on a first wavelength that is directed along the longitudinal axis, and the second band gap is adapted to block a spectral band of radiation centered on a second wavelength that is directed transversely to the longitudinal axis. The method also includes transmitting inspection radiation of a wavelength tuned near the first band gap through the photonic fiber, and determining displacement within the structure according to an amount of radiation detected through at least one of the core section and the cladding.

In some implementations, fluorophores are embedded within the cladding.

Some embodiments of the method of the present invention further comprise positioning a collection fiber adjacent to the cladding of the photonic fiber, and monitoring radiation at an output of the collection fiber.

In some implementations, the method includes embedding a second photonic fiber within the structure, the second photonic fiber having a core section with a third bad gap different from the first band gap, and determining whether a displacement is a compression or extension according to a wavelength of radiation detected at the output of the collection fiber. The monitoring can be performed remotely from the photonic sensor.

In further embodiments, the method of the present invention further comprises embedding fluorophores of first and second types within the core section, the fluorophores of the second type being excitable by emissions of the fluorophores of the first type. The core section can comprise a Fiber Bragg grating and the cladding section is composed of photonic crystal fiber.

These and other aspects, features, and advantages can be appreciated from the following description of certain embodiments of the invention and the accompanying drawing figures and claims. The drawings are illustrative and exemplary, and do not necessarily accurately indicate the scale, either in an absolute sense, or a relative sense, of the elements depicted.

BRIEF DESCRIPTION OF THE DRAWINGS

FIG. 4 is a schematic perspective view of another embodiment of a photonic displacement sensor according to the present invention including two fiber sensors.

DETAILED DESCRIPTION OF CERTAIN EMBODIMENTS OF THE INVENTION

Photonic devices, such as photonic bandgap fibers, include materials that include a spatial periodic modulation of an optical property, such as refractive index or dielectric constant. The modulation of the optical property imparts spectral sensitivity to the material. In particular, a selected modulation can cause the material to reflect incoming radiation within a limited spectral band, termed the "band gap", and to transmit all other portions of the spectrum. Such materials are termed "band gap" materials. Photonic devices including band gap materials are useful detection elements for strain and displacement sensors because extension or compression of the material causes a corresponding change in the periodic modulation of the optical property, which in turn causes a shift in the band gap toward a higher or lower wavelength. This shift is measurable by "interrogating" the band gap material using "inspecting radiation". The manner in which the inspection radiation is reflected and/or transmitted by and through the material can then reveal displacement or deformation in the material.

Figure 1:
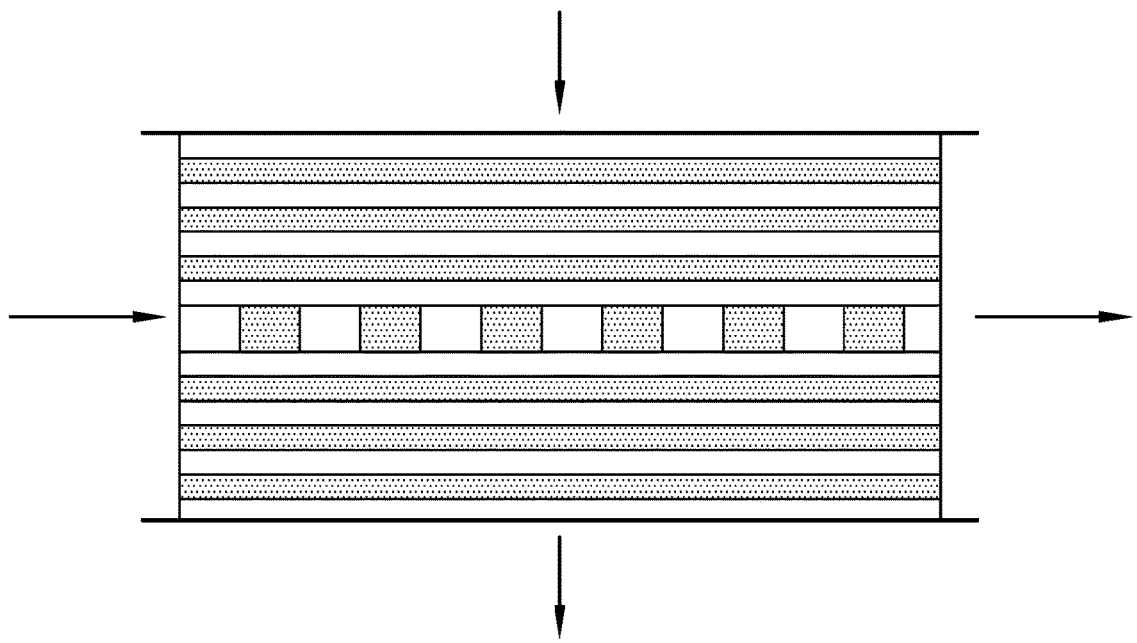
FIG. 1 is a schematic illustration of a photonic material with a two one-dimensional band gaps according to an embodiment of the present invention.

Band gap materials can be one-dimensional, two-dimensional or three-dimensional in that the perturbation or variation in the optical characteristic of the material can vary spatially along orthogonal axes. For example, in a multi-dimensional band gap material, periodic modulation of the dielectric constant differs along different spatial axes at angles to one another. FIG. 1 is a schematic illustration of a photonic material 100 with a two differing one-dimensional band gaps according to an embodiment of the present invention. The photonic material includes a central core 102 which includes a number of modulated sections, e.g., 104, 106, 108, 110 aligned along a longitudinal axis (L1). The core section are fabricated such that adjacent portions, e.g., 104, 106 have alternating dielectric constants. The alternating sections give the photonic material a bandgap centered on a first wavelength $\lambda_1$ along axis (L1). That is to say that polychromatic light propagating through core 102 along axis L1 would have a spectral portion centered on wavelength $\lambda_1$ reflected, while remaining spectral components would be transmitted along axis L1. Photonic material 100 also includes alternating sections, e.g. 112, 114, 116, 118 arranged along a traverse axis (L2). Transverse sections 112, 114, 116, 118, also have alternating dielectric constants. This may be achieved using different techniques. In some implementations, the photonic material comprises a photonic crystal fiber that includes hollow tubes that alternate with glass material to create the alternating dielectric constant effect. The transverse sections give the photonic material a bandgap centered on a second wavelength 2 along traverse axis (L2). Light propagating through the photonic material along axis L2 would have a spectral portion centered on wavelength 2 reflected, while remaining spectral components would be transmitted along axis L2.

In typical applications, the photonic material is typically elongated along a particular axis (e.g., L1) to serve as a transmission path, such as in a fiber or cable. In this geometry, the periodic modulation along the elongated axis is orders of magnitude more extended than along other directions. Inspection radiation is able to propagate along the longitudinal direction, undisturbed under normal conditions.

Figure 2:
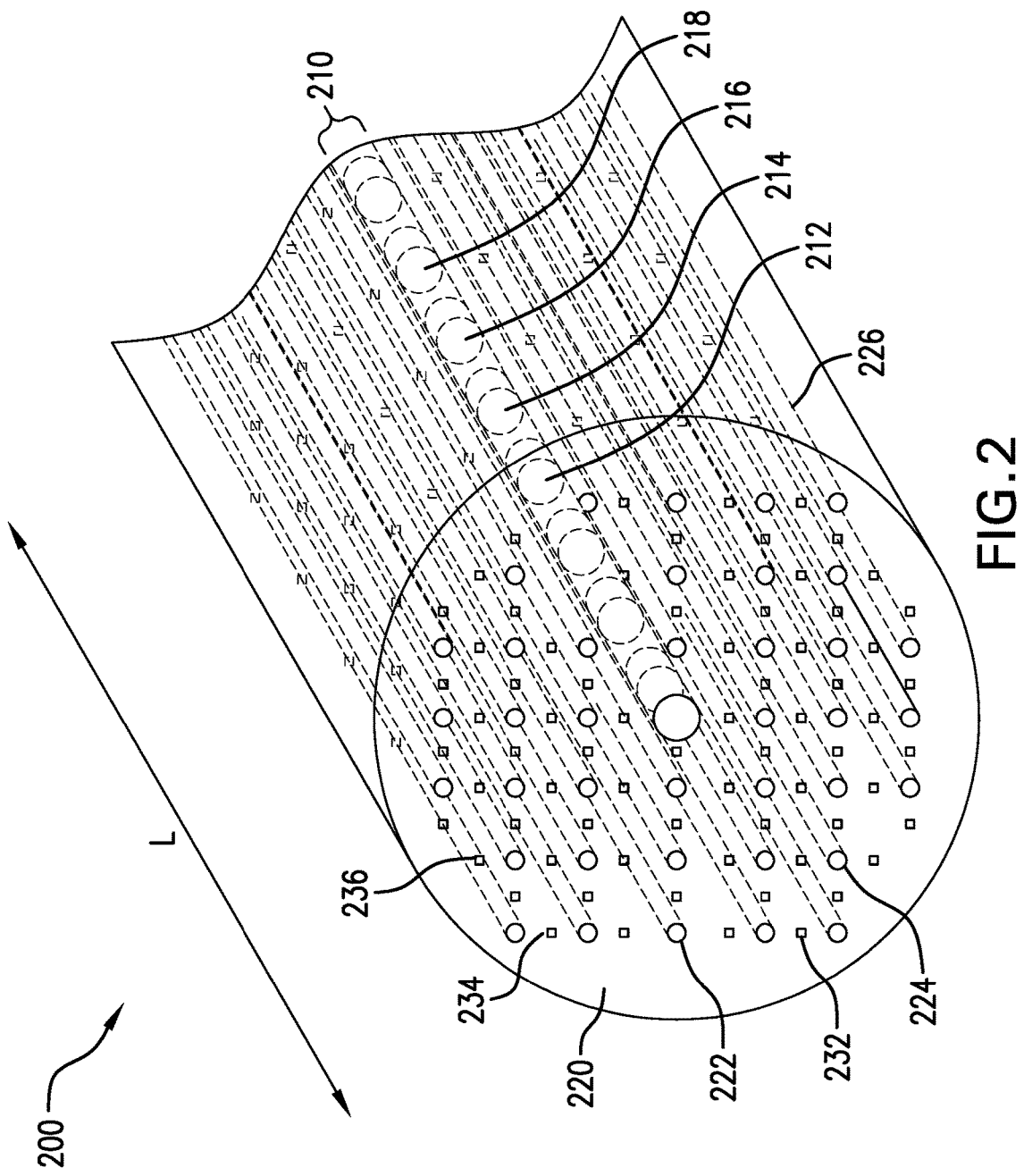
FIG. 2 is a schematic perspective view of an embodiment of a photonic displacement sensor according to the present invention.

FIG. 2 shows an embodiment of a photonic displacement sensor 200 according to the present invention that is implemented as a photonic band gap fiber. The sensor 200 includes a core 210 and surrounding cladding 220 and extends along a longitudinal axis (L). The core 210 includes sections of periodically alternating refractive index e.g., sections 212, 214, 216, 218 arranged longitudinally along axis L. The core 210 is intended to transmit a large proportion of inspection radiation along the length of the device for monitoring purposes. The core 210 may be fabricated from glass or polymeric material. The cladding 220 surrounds the core and has a patterned crystal structure. The patterned structure of cladding 220 includes tubules, e.g., 222, 224, 226 arranged in an approximately symmetric pattern around the core. The tubules can be hollow (i.e., can contain air) or can contain another material that has a different refractive index from the surrounding base material of the crystal structure (e.g., a polymer silica). In this configuration, when viewed along a radial direction, the alternation between regions of tubules and base material creates a band gap along radial axes. Alternative configurations for providing regions of alternating refractive index in the cladding 220 can also be used. The refractive index of the base material of cladding 220 is also selected to be higher than the index of the core. In photonic band gap fibers, radiation can be guided within the core by the band gap of the cladding rather than merely through the difference between the refractive indices of the core and cladding. When the wavelength of the transmitted radiation is selected to be within the band gap, the band gap of the fiber cladding thereby guides transmitted radiation within the core 210 during normal conditions to promote high transmission efficiency.

Cladding 220 also includes embedded fluorophores e.g., 232, 234, 236 which constitute materials that upon excitation by absorption of radiation of a first wavelength re-emit radiation of a longer wavelength. The fluorophores 232, 234, 236 can be organic molecules, transition metal or lanthanide ions, quantum dots or semiconductor nanocrystals with selectable absorption and emission bands. For the purposes of the embodiment of FIG. 1, the fluorophores 232, 234, 236 can be selected to have an absorption band that overlaps the band gap of the photonic material of the core 210.

In operation, inspection radiation is used to determine whether device 200 has been disturbed and subject to strain. Inspection radiation of a selected wavelength slightly outside of the band gap of the core 210 is transmitted along axis (L). In the absence of disturbance, the inspection radiation will propagate through the core unaffected. A compressive or tensile perturbation in the cladding 220 changes the periodic modulation of the refractive index and the energy of the band gap of the cladding 220. Due to these changes, the interface between the core 210 and cladding 220 no longer maintains total internal reflection, and radiation from the core can leak into the cladding. The amount of radiation leaked is roughly proportional to the degree of the perturbation. The leaked radiation can be detected directly or the radiation can be amplified by exciting fluorophores 232, 234, 236. The resulting emission of fluorophores 232, 234, 236 will then also roughly proportional to the amount of radiation they absorb, and thus to the level of perturbation. The emissions from fluorophores 232, 234, 236 can be detected in a number of different ways. In some implementations, the emissions can be observed directly. Alternatively, the emissions can be monitored continuously through the length of the fiber.

Figure 3:
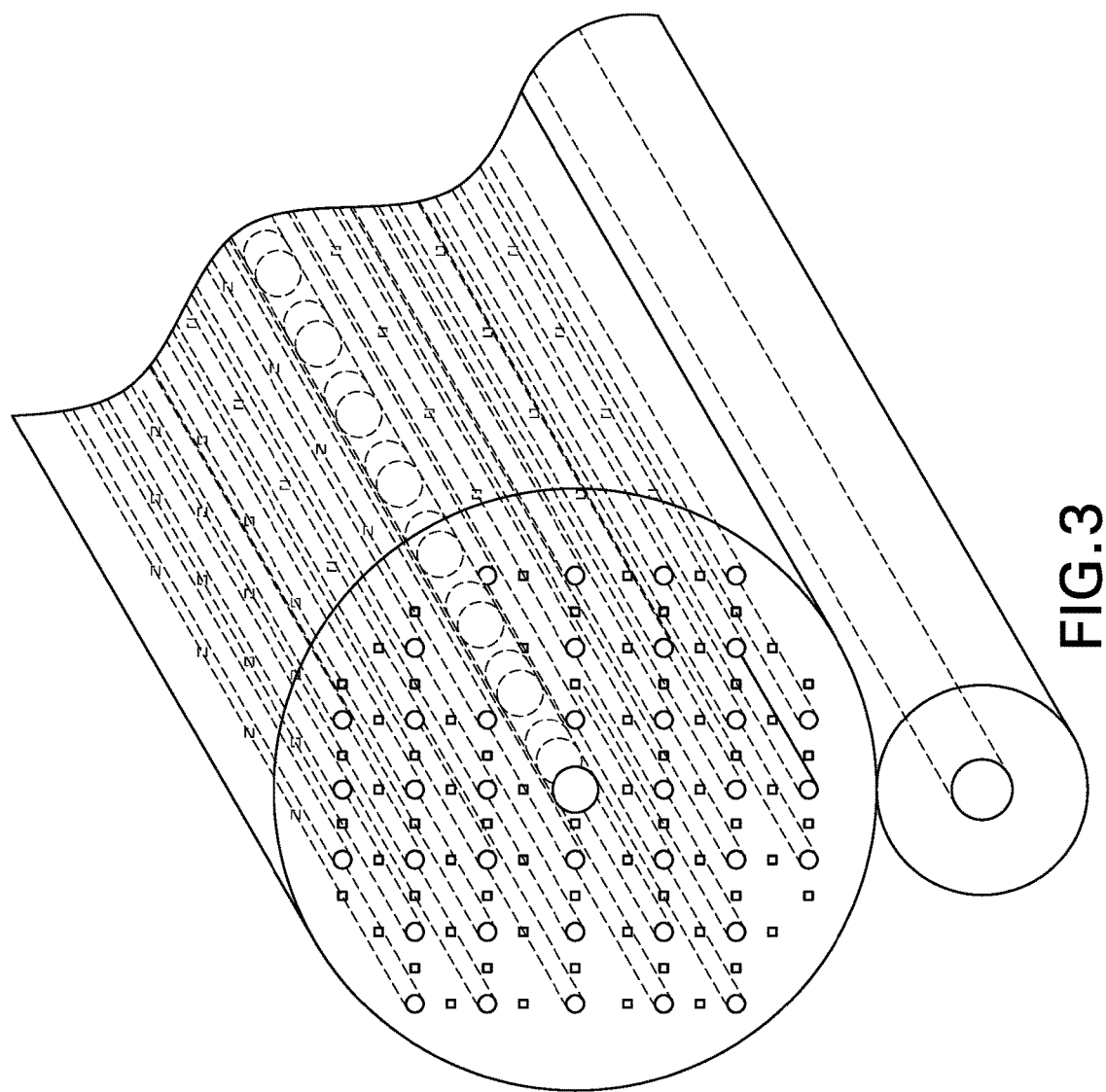
FIG. 3 is a schematic perspective view of another embodiment of a photonic displacement sensor according to the present invention including a collection fiber.

In another embodiment of a photonic displacement sensor depicted in FIG. 3, an additional fiber 250 is positioned adjacent to the sensor 200 and used to collect the radiation emitted by the fluorophores 232, 234, 236 though the cladding 220. Additional fiber 250 can be a regular optical fiber and need not be a photonic crystal fiber or include fiber Bragg Grating features. As radiation captured by the additional fiber 250 can propagate undisturbed over the length of the fiber, perturbations of sensor 200 can be detected remotely at the output of fiber 250. The presence of radiation at the remote location indicates that a perturbation has occurred. The intensity of the monitored radiation corresponds to the magnitude (distance) or position of the perturbation.

It is preferable for the inspection radiation to be tuned close to the band gap of the core 210 so that in the case of perturbations along the axis of the fiber, the associated shift in the core band gap can overlaps the wavelength of the inspection radiation. However, the correct shift occurs only if the correct type of perturbation, expansion versus contraction occurs, since expansion and contraction will tend to shift the band gap in opposite directions. Therefore in order to be able to comprehensively monitor a structure for both types of displacement, two displacement sensors 400, 450 can be used, as shown in FIG. 4. Sensors 400, 450 can each be identical in form and have the same type of photonic crystal fiber shown in FIG. 2 including a structured cladding and fluorophores. Sensor 400 has core section 410 and sensor 450 has core section 460. Core section 410 has a first band gap BG1, while core section 460 has a second band gap BG2, in which BG1 and BG2 are not equal. In particular, it is useful if BG1 is slightly higher than the inspection wavelength and BG2 is slightly below the inspection wavelength (or vice versa). For example, the inspection wavelength can be centered in the visible spectrum somewhere in the green at around 530 nm, BG1 can be set slightly below the inspection wavelength at 500 nm and BG2 at slightly above the inspection wavelength at, for example, 560 nm. In case in which the propagation of the inspection wavelength is blocked in BG1, a compression of the fiber is indicated; if the inspection wavelength is blocked in BG2, an extension of the fiber is indicated.

In this case sensor 400, having BG1, is sensitive to tensile stresses, while sensor 450, having BG2, is sensitive to compressive stresses. In this embodiment, a collection fiber 480 can also be used. While it is possible to use a collection fiber for each sensor, in some embodiments, a single collection fiber can be used to receive leaked radiation and fluorophore emissions from both sensors 400, 450.

Figure 5A:
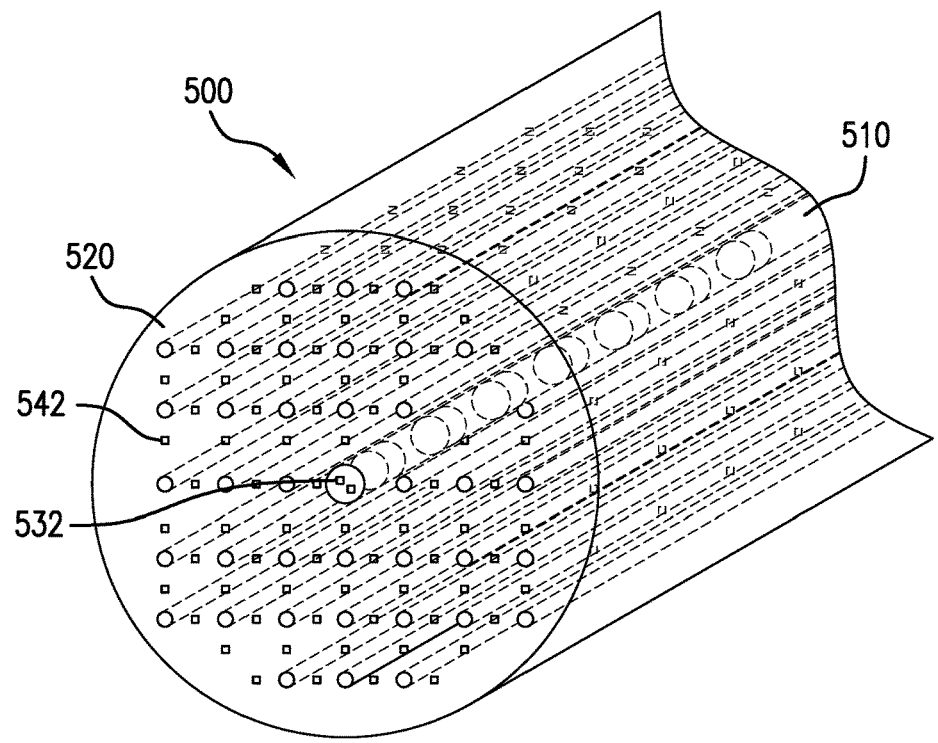
FIG. 5A is a schematic perspective view of another embodiment of a photonic displacement sensor according to the present invention including fluorophores in a fiber core.

FIG. 5A illustrates another embodiment of a photonic displacement sensor according to the present invention. The sensor 500 also includes a core section 510 and cladding 520. In this embodiment, the core 510 includes fluorophores. e.g., 532 (collectively) and has a spectral band gap BG3. The cladding also includes fluorophores, e.g., 542. The emission wavelength of fluorophores 532 overlaps with band gap BG3 under normal conditions (without displacement or deformation). Thus under normal conditions, any fluorophore emissions through the core 510 are blocked by the band gap BG3. In operation of the sensor, if stress occurs in the core 510, the band gap BG3 shifts to an altered band gap BG3', which does not coincide with the emission wavelength of the fluorophores 532, 534, 536. Emissions from the fluorophores are then no longer blocked and can propagate through the core 510 and be monitored remotely at the output of the fiber sensor. The intensity of the emissions is directly proportional to the level of perturbation of the core.

Figure 5B:
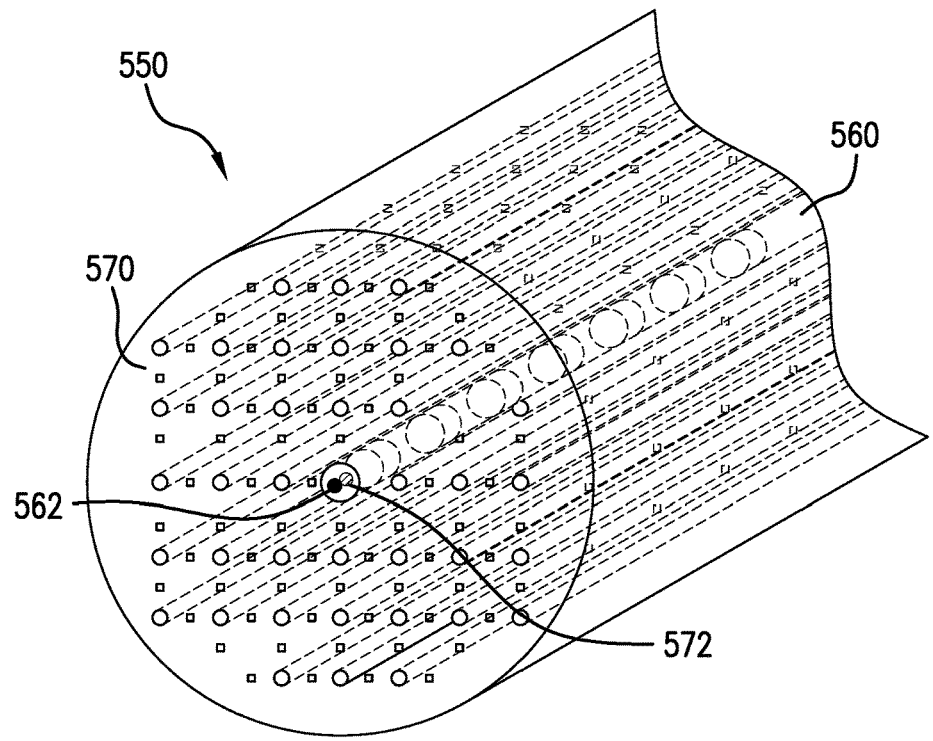
FIG. 5B is a schematic perspective view of another embodiment of a photonic displacement sensor according to the present invention having two types of fluorophores in the core.

FIG. 5B illustrates a variation of the embodiment of FIG. 5A in which a photonic sensor 550 includes fluorophores of two types that are able interact. The first type of fluorophore, e.g., 562 (collectively), is positioned in core section 560, and the second type of fluorophore, e.g., 572 (collectively), is also positioned in core section 560. Fluorophore 572 is selected to be excitable by the emissions of fluorophore 562. When the core is stressed and emissions from fluorophore 562 migrate within and out of core 560, there is an energy transfer to fluorophore 572, which emits radiation in turn. In this manner the emissions from fluorophore 572 will be proportional to the magnitude of stress in the core 560. The band gap BG4 of the core 560 is tuned to the energy transfer wavelengths between fluorophore 562 and fluorophore 572 (i.e., the emission wavelengths of fluorophores 562, 572). Thus while fluorophore 562 can be continually excited by the inspection radiation wavelength travelling through core 560, under normal non-stressed conditions, the band gap BG4 at least partially hinders the resulting emissions of fluorophore 562 from migrating to fluorophore 572. When core 560 is perturbed, and the band gap BG4 of the core shifts correspondingly, emissions from fluorophore 562 can migrate to and excite fluorophore 572. In addition, the resulting emissions from fluorophore 572 can travel more freely along the fiber, increasing the overall intensity of fluorescence and radiation that can be captured.

In another variation of the same embodiment, no energy transfer is required between the fluorophores. The emission of fluorophore 562 is at a slightly shorter wavelength than the wavelength of band gap of the core, while the emission of the other fluorophore 572 is at a slightly longer wavelength. In normal operating conditions, both emissions propagate through the fiber together with the excitation wavelength. In case of a compressive deformation, the bang gap of the core Bragg grating will overlap with the shorter wavelength fluorophore, while in case of tensile deformation it will overlap with the longer wavelength fluorophore. Therefore, it is possible to monitor deformation by observing which emission wavelength is missing.

An example of fluorophores suitable for this mechanism are Lanthanide ions $Tm^{3+}$ (Thulium) for fluorophore 562 and $Dy^{3+}$ (Dysprosium) for fluorophore 572. The inspection radiation wavelength can be tune to excite any energy level of above the $^1G_4$ level, for example the $^1D_2$ level at 370 nm. It is advantageous for the cladding 570 to also be tuned at the same energy level in order to keep the inspection radiation within the core 560. As the energy transfer between $Tm^{3+}$ and $Dy^{3+}$ occurs through levels $^1G_4 \rightarrow {}^4F_{9/2}$, band gap BG4 is tuned at the transfer energy of 500 nm. When perturbation occurs, the embodiment provides for an amplification of the monitored signal since a greater intensity of radiation is transmitted per unit or perturbation. Numerous other suitable fluorophore combinations can also be used with an appropriately tuned excitation wavelength. In particular, another example fluorophore system utilizes a near infrared wavelength at 1550 nm to propagate through the core. This wavelength is commonly utilized in fiber optics communication and defined as the conventional C-band. It is generated using Erbium ($Er^{3+}$). This fluorophore system has the advantage that most fiber optics are optimized to work with this wavelength. In this case, the energy transfer mechanism considered is an up-conversion, so that the emission is transferred to a fluorophore emitting at a much higher energy in the visible range. Through this mechanism, an invisible radiation is transformed into a visible radiation in presence of strain. The 980 nm wavelength of $Yb^{3+}$ can be used in the core to obtain similar results.

Figure 6:
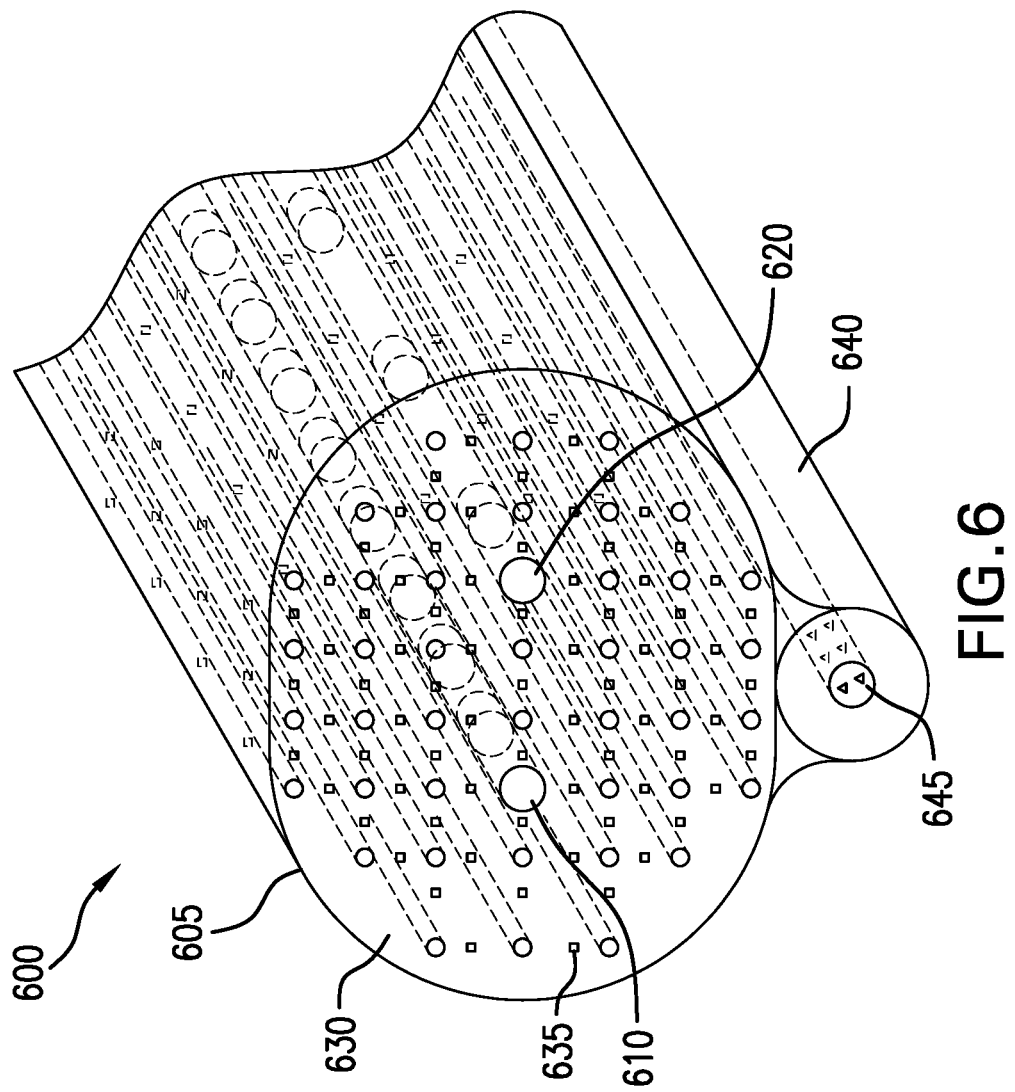
FIG. 6 is a schematic perspective view of another embodiment of a photonic displacement sensor according to the present invention including a dual-core fiber.

FIG. 6 depicts another embodiment of a photonic displacement sensor 600 according to the present invention which has a compact design. Sensor 600 comprises a photonic crystal fiber 605 having two cores 610, 620 surrounded by a cladding 630. An additional collection fiber 640 is positioned adjacent to fiber 605. Core 610 has a band gap BGDC 1, core 620 has a band gap BGDC 1 and cladding 630 has a band gap BGDC 3. Radiation is guided within cores 610, 620 largely as determined by the photonic band gap of the cladding BGDC 3. The wavelength of the inspection radiation is tuned so that it is higher than band gap BGDC 1 and lower than band gap BGDC 2 or vice versa. A compressive stress in the core 610 will cause BGDC 1 to shift and overlap with the wavelength radiation of the inspection radiation, and thus cause radiation quenching. A tensile stress in core 620 will cause BGDC 1 to shift and overlap with the wavelength radiation of the inspection radiation, and thus also cause radiation quenching. Additionally, a compressive or tensile stress along the direction perpendicular to the direction of the fiber will cause a change in the periodic structure of the cladding 630 and, therefore, the radiation transmitted through the core can leak through the cladding 630. Detection of leaked radiation directly indicates of the presence of stress in the cladding. To facilitate the detection of leaked radiation, in some implementations cladding 630 can include fluorophores e.g., 635 excitable by the inspection radiation. The intensity of any fluorophore emission is then directly proportional to the magnitude of the radiation leak and to the perturbation of the cladding.

The leak of radiation or the emissions of fluorophores 635 can be collected through a third core or through additional fiber 640. Additional fiber 640 can be a regular optical fiber and need not be a photonic crystal fiber or include fiber Bragg Grating features. The function of fiber 640 is to transport the leaked radiation or the fluorophore emissions without significant loss to near or remote monitoring equipment. In some implementations, fluorophores e.g., 645 can also be incorporated in the core of collection fiber 640. Radiation leaked from the photonic fiber 605 fluorophore can excite fluorophores 645 in the collection fiber 640 and thereby boost the output signal. In this sensor 600, both fluorophores 635, 645 can also be used simultaneously in that fluorophore 635 detects and enhances the leak caused by any perturbation so that a greater intensity of radiation reaches collection fiber 640. Consequently, fluorophore 645 detects and enhances the radiation received at collection fiber 640.

In general, the wavelength of the inspection radiation transmitted can be selected based on the sizes of the smallest displacements or perturbations in the structures for which monitoring is desired to be monitored. The desired monitored perturbation size determines the dimensions of the periodicity of the photonic structure and the wavelength ranges of the associated band gaps.

The embodiments described provide several advantageous features. The use of photonic crystal band gap fibers provides multi-dimensional displacement detection. The addition of fluorophores enhances the ease of detection by boosting radiation leaks and/or emissions caused by displacement and deformation. The fluorophores enhance detection of stress and strain in the photonic material by the presence or absence of emission. The addition of a two-dimensional band gap adds sensitivity along radial or transverse axes. In addition, due to the fact that the tunable band gap wavelengths are high-energy (short wavelength), the sensitivity of the sensors can be very high, in the sub-micron range.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements. For the purpose of brevity certain elements of which there are a large number have been referred to by subset including the initial use of "e.g." which in subsequent cases are referred to without the use of "e.g." It is to be understand that the subset referred to by "e.g." refers to all similar elements, and that the later use of the subset without "e.g." should not be limiting but should also be understood to represent all such similar elements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes can be made and equivalents can be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A photonic displacement sensor, comprising:
   a photonic fiber including:
   a core section having a first band gap aligned along an extended longitudinal axis;
   a cladding section surrounding the core section having a second band gap; and
   a plurality of fluorophores embedded within the cladding section;
   wherein the first band gap is adapted to block a spectral band of radiation centered on a first wavelength that is directed along the longitudinal axis, and the second band gap is adapted to block a spectral band of radiation centered on a second wavelength that is directed transversely to the longitudinal axis, and
   wherein displacement is detected based on a shift in at least one of the first and second band gap of the photonic fiber, enabling an intensity of radiation to be detected that is in proportion to the displacement in the photonic fiber.

2. The photonic displacement sensor of claim 1, wherein the core section comprises a Fiber Bragg grating and the cladding section is composed of photonic crystal fiber.

3. The photonic displacement sensor of claim 1, further comprising a collection fiber positioned adjacent to the cladding of the photonic fiber so as to receive radiation leaked through the cladding.

4. The photonic displacement sensor of claim 1, further comprising a second photonic fiber including a core section having a third band gap and a cladding section surrounding the core section, wherein the first photonic fiber is adapted to sense tension and the second photonic fiber is adapted to sense compression or vice versa.

5. The photonic displacement sensor of claim 4, further comprising a collection fiber positioned adjacent to the cladding of the photonic fiber so as to receive radiation leaked through at least one of the first photonic fiber and the second photonic fiber.

6. The photonic displacement sensor of claim 1, further comprising a plurality of fluorophores positioned in the core section, the plurality of fluorophores having an emission wavelength that overlaps the first band gap.

7. The photonic displacement sensor of claim 6, wherein the plurality of fluorophores include fluorophores of a first type and fluorophores of a second type, the fluorophores of the second type being excitable by emissions of fluorophores of the first type.

8. The photonic displacement sensor of claim 7, wherein the first type of fluorophore has an emission wavelength slightly shorter that the first band gap of the core and the second type of fluorophore has an emission wavelength slightly longer than the first band gap of the core.

9. The photonic displacement sensor of claim 7, wherein the fluorophores of the first type include Thulium ($Tm^{+3}$) ions and the fluorophores of the second type include Dysprosium ($Dy^{+3}$) ions.

10. The photonic displacement sensor of claim 1, further comprising a second core section within the cladding, the second core section having a third band gap different from the first band gap of the first core section.

11. The photonic displacement sensor of claim 10, further comprising a plurality of fluorophores positioned in the cladding section.

12. The photonic displacement sensor of claim 10, further comprising a collection fiber positioned adjacent to the cladding so as to receive radiation the cladding.

13. The photonic displacement sensor of claim 12, wherein the collection fiber includes a plurality of fluorophores.

14. A method of determining displacement in a structure, comprising:
   providing a photonic sensor, the photonic sensor being embedded in the structure and comprising a photonic fiber having a core section with a first band gap aligned along an extended longitudinal axis and a cladding section surrounding the core section with a second band gap, wherein the first band gap is adapted to block a spectral band of radiation centered on a first wavelength that is directed along the longitudinal axis, the second band gap is adapted to block a spectral band of radiation centered on a second wavelength that is directed transversely to the longitudinal axis, and the cladding comprises fluorophores embedded therein; and
   transmitting inspection radiation of a wavelength tuned near the first band gap through the photonic fiber; and
   determining displacement within the structure according to an amount of radiation detected through at least one of the core section and the cladding.

15. The method of claim 14, further comprising:
   positioning a collection fiber adjacent to the cladding of the photonic fiber; and
   monitoring radiation at an output of the collection fiber.

16. The method of claim 15, further comprising:
   embedding a second photonic fiber within the structure, the second photonic fiber having a core section with a third bad gap different from the first band gap; and
   determining whether a displacement is a compression or extension according to a wavelength of radiation detected at the output of the collection fiber.

17. The method of claim 15, wherein the monitoring is performed remotely from the photonic sensor.

18. The method of claim 14, further comprising embedding fluorophores of first and second types within the core section, the fluorophores of the second type being excitable by emissions of the fluorophores of the first type.

19. The method of claim 14, wherein the core section comprises a Fiber Bragg grating and the cladding section is composed of photonic crystal fiber.

20. The method of claim 14, wherein when displacement does not occur, radiation of a first wavelength propagates through the core and excites fluorophores that emit a second wavelength which can be detected,
  wherein when longitudinal displacement occurs, the first wavelength is blocked in the core and the fluorophores in the cladding are not be excited and therefore the second wavelength is not detected, and
  wherein when transverse displacement occurs, the second band gap is modified, and emits a third wavelength, different from the second wavelength, which can be detected.

* * * * *